(12) United States Patent
Chesebro et al.

(10) Patent No.: US 7,996,837 B2
(45) Date of Patent: Aug. 9, 2011

(54) RECOVERY MECHANISM FOR TRANSACTIONS

(75) Inventors: Brian Christopher Chesebro, Londonderry, NH (US); James William Gish, Sudbury, MA (US); Chinnappa Ganapathy Codanda, Boston, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1498 days.

(21) Appl. No.: 11/416,906

(22) Filed: May 3, 2006

(65) Prior Publication Data

US 2007/0261054 A1    Nov. 8, 2007

(51) Int. Cl.
    *G06F 9/46* (2006.01)
(52) U.S. Cl. .................. 718/100; 719/316
(58) Field of Classification Search .......... 718/101, 718/104, 100; 714/2, 4, 100, 6.12, 15, 20; 719/310, 318
    See application file for complete search history.

(56) References Cited

U.S. PATENT DOCUMENTS

| | | | |
|---|---|---|---|
| 5,278,982 A * | 1/1994 | Daniels et al. ................. 1/1 |
| 5,410,703 A | 4/1995 | Nilsson et al. |
| 5,465,328 A | 11/1995 | Dievendorff |
| 5,963,911 A * | 10/1999 | Walker et al. ................ 705/7 |
| 6,052,695 A * | 4/2000 | Abe et al. ...................... 1/1 |
| 6,154,847 A * | 11/2000 | Schofield et al. ............. 714/4 |
| 6,338,146 B1 * | 1/2002 | Johnson et al. ............... 714/4 |
| 6,429,860 B1 | 8/2002 | Hughes |
| 6,493,826 B1 * | 12/2002 | Schofield et al. ............ 726/22 |
| 6,557,168 B1 | 4/2003 | Czajkowski |
| 6,823,519 B1 | 11/2004 | Baird |
| 6,895,529 B2 * | 5/2005 | Egolf et al. .................. 714/15 |
| 6,996,614 B2 * | 2/2006 | Hallinan et al. ............. 709/226 |
| 7,080,145 B2 | 7/2006 | Srivastava |
| 7,089,584 B1 | 8/2006 | Sharma |
| 7,290,056 B1 * | 10/2007 | McLaughlin, Jr. .......... 709/230 |
| 7,346,905 B2 * | 3/2008 | Dorrance et al. ............ 718/104 |
| 7,373,555 B2 * | 5/2008 | Adkisson et al. ............. 714/43 |
| 7,418,718 B2 | 8/2008 | Liu et al. |
| 7,448,035 B2 * | 11/2008 | Dorrance et al. ............ 718/101 |
| 7,484,224 B2 | 1/2009 | Potter et al. |
| 7,506,338 B2 | 3/2009 | Alpern et al. |
| 7,506,342 B2 | 3/2009 | Mousseau et al. |
| 7,644,403 B2 | 1/2010 | Atsatt |
| 2001/0029519 A1 * | 10/2001 | Hallinan et al. ............. 709/104 |
| 2002/0099837 A1 * | 7/2002 | Oe et al. ..................... 709/229 |
| 2002/0147971 A1 | 10/2002 | Adams |
| 2003/0061515 A1 | 3/2003 | Kindberg |
| 2003/0093470 A1 | 5/2003 | Upton |
| 2004/0015859 A1 | 1/2004 | Potter et al. |
| 2004/0158819 A1 | 8/2004 | Cuomo et al. |
| 2004/0187127 A1 | 9/2004 | Gondi |

(Continued)

OTHER PUBLICATIONS

Kniesel, G. et al., JMangler—A Framework for Load-Time Transformation of Java Class Files, IEEE, Aug. 6, 2002, 11 pages.

(Continued)

*Primary Examiner* — Van Nguyen (74) *Attorney, Agent, or Firm* — Fliesler Meyer LLP (57) ABSTRACT

In accordance with embodiments, there are provided mechanisms and methods for recovering from an incomplete transaction. These mechanisms and methods can enable embodiments to detect incomplete transactions when recovering from a server crash or other catastrophic event. Some embodiments can automatically re-establish interrupted connections when incomplete transactions have been detected. The ability of embodiments to detect incomplete transaction can allow recovery to initiate substantially immediately upon server restart and adapter redeployment.

12 Claims, 4 Drawing Sheets

U.S. PATENT DOCUMENTS

| | | |
|---|---|---|
| 2004/0255294 A1 | 12/2004 | Spotwood |
| 2005/0003850 A1 | 1/2005 | Tsuda |
| 2005/0015425 A1 | 1/2005 | Kumar |
| 2005/0187891 A1 | 8/2005 | Johnson |
| 2006/0112379 A1 | 5/2006 | Chirakansakcharoen et al. |
| 2006/0129983 A1 | 6/2006 | Feng |
| 2006/0218200 A1* | 9/2006 | Factor et al. ............ 707/200 |
| 2006/0224633 A1 | 10/2006 | Fahmy |
| 2006/0259526 A1* | 11/2006 | Booz et al. ............ 707/202 |
| 2006/0271814 A1* | 11/2006 | Fung et al. ............ 714/4 |
| 2007/0043784 A1* | 2/2007 | Parkinson ............ 707/202 |
| 2007/0061795 A1 | 3/2007 | Atsatt |
| 2007/0061796 A1 | 3/2007 | Atsatt |
| 2007/0061798 A1 | 3/2007 | Atsatt |
| 2010/0070960 A1 | 3/2010 | Atsatt |

OTHER PUBLICATIONS

Gong, L., Secure Java Class Loading, IEEE, Dec. 1998, pp. 56-61.

* cited by examiner

RECOVERY MECHANISM FOR TRANSACTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in their entirety:

U.S. patent application Ser. No. 11/282,060 entitled PRODUCTION REDEPLOYMENT, by James William Gish, et al., filed on Nov. 17, 2005;

U.S. patent application Ser. No. 11/281,968 entitled RESOURCE ADAPTOR CLASSLOADING, by Codanda Ganapathy Chinnappa, et al., filed on Nov. 17, 2005;

U.S. patent application Ser. No. 11/281,831 entitled SUSPENDABLE RESOURCE ADAPTOR INTERFACE, by James William Gish, et al., filed on Nov. 17, 2005; and U.S. patent application Ser. No. 11/416,906 entitled RECOVERY MECHANISM FOR TRANSACTIONS, by Brian Christopher Chesebro, et al., filed on May 3, 2006.

FIELD OF THE INVENTION

The current invention relates generally to techniques for providing interconnectivity between one or more application servers and one or more enterprise information systems, and more particularly to a mechanism for recovering from an incomplete transaction.

BACKGROUND

Since its inception in 1995, the Java™ programming language has become increasingly popular. (Java™ is a trademark of Sun Microsystems, Inc.) Java, which is an interpreted language, enabled the creation of applications that could be run on a wide variety of platforms. This ability to function across a variety of different client platforms, i.e., platform independence, and Java's relatively easy implementation of network applications has resulted in the use of Java, as well as other programming languages that provide platform independence, in endeavors as basic as personal web pages to endeavors as complex as large business-to-business enterprise systems.

However, since applications, as well as the Enterprise Information Systems (EIS) to which the applications connect, may be provided by many different vendors, a mechanism that enables these disparate computational entities to communicate with one another was needed. The Java 2 Platform Enterprise Edition (J2EE) is a specification that addresses such needs.

J2EE Connector Architecture provides a mechanism for integrating J2EE-compliant application servers with enterprise information systems. The J2EE Connector Architecture defines a Common Client Interface (CCI) for EIS access. The CCI defines a client API that enables clients to interact with heterogeneous enterprise information systems. Application servers, i.e., servers onto which applications may be deployed, and Enterprise Information Systems need only follow a J2EE Connector Architecture specification in order to interconnect with one another.

Unfortunately, the J2EE specification does not resolve all interconnection issues. For example, one area of concern is detecting and remedying incomplete transactions that can occur in the event of a server crash or other unforeseen interruption. Transactional applications often employ various approaches attempting at coordinating the processing for a transaction. Such conventional approaches, however, can fail to detect the presence of an incomplete transaction for a period of time. Additionally, since such conventional approaches may create unneeded connections during the process of checking for an incomplete transaction.

What is needed is an improved mechanism for recovering from an incomplete transaction.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for recovering from an incomplete transaction. These mechanisms and methods can enable embodiments to detect incomplete transactions when recovering from a server crash or other catastrophic event. Some embodiments can automatically re-establish interrupted connections when incomplete transactions have been detected. The ability of embodiments to detect incomplete transaction can allow recovery to initiate substantially immediately upon server restart and adapter redeployment. Creating real adapter connections unnecessarily for recovery can be avoided.

In an embodiment, a method for recovering from an incomplete transaction is provided. One method embodiment includes creating a dummy resource and registering the dummy resource with a Transaction Manager using a name that would have been used by a previous use of a Resource Adapter before a server crash. The Transaction Manager checks the name to determine whether the name was involved in an unresolved transaction. The Transaction Manager invokes the dummy resource to initiate recovery when the Transaction Manager has determined that the name was involved in an unresolved transaction. This processing can enable embodiments to provide a notification mechanism by which a Transaction Manager is enabled to determine that recovery is needed. In an embodiment, the method can also include creating, by the Transaction Manager, a real connection via the Resource Adapter. The recover request is passed on to a Resource Manager associated with the Resource Adapter.

Embodiments employing the XA protocol, which is a two-phase commit protocol defined by the X/Open DTP group, will be described in order to provide illustrative examples of the techniques provided by the present invention. XA is natively supported by many databases (like Oracle™) and transaction monitors (like Tuxedo™). For further details regarding the XA protocol, reference may be had to "Distributed Transactional Processing: The XA Specification" by The Open Group (1992) which defines the requirements for both transaction managers and resource managers involved in an XA transaction. While the present invention is described with reference to an embodiment in which techniques for recovering from an interrupted connection are implemented in conformance with the XA protocol, the present invention is not limited to the XA protocol. Embodiments may be practiced using other interconnectivity specifications or programming languages, i.e., JSP and the like without departing from the scope of the embodiments claimed. (Java™ is a trademark of Sun Microsystems, Inc.)

Figure 1:
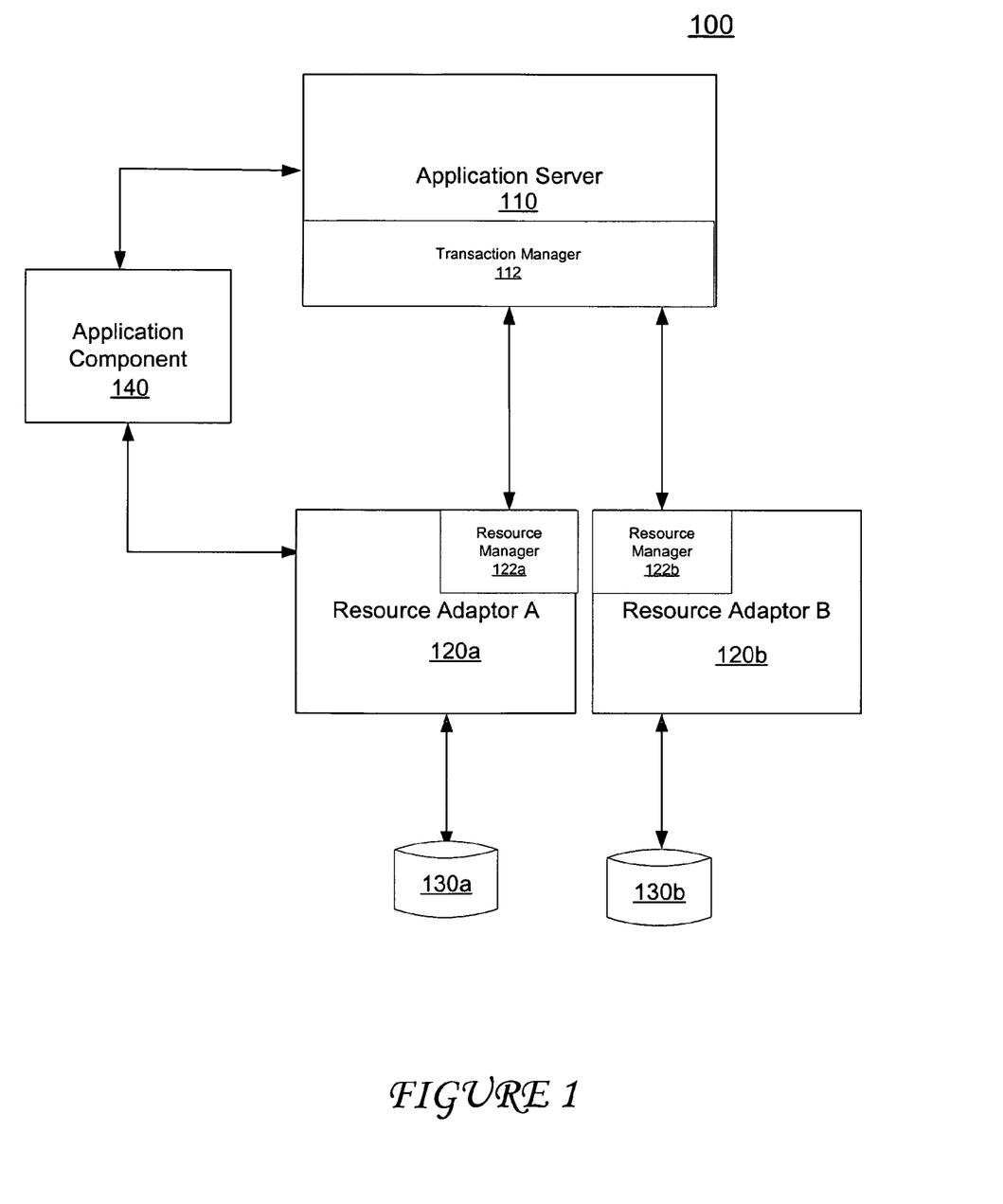
FIG. 1 is functional block diagram of an example computing environment in which techniques for recovering from an incomplete transaction in an embodiment may be implemented.

FIG. 1 is functional block diagram of an example computing environment implementing a connector architecture in which techniques for recovering from an incomplete transaction in an embodiment may be implemented. As shown in FIG. 1, a connector architecture implementation 100 includes application server 110, resource adaptors 120a, 120b, resources 130a, and 130b and application component 140. As used herein, the term application server is defined broadly as a server computer in a computer network dedicated to running certain software applications. Application server 110 exists in conjunction with a web server (not shown in FIG. 1 for brevity) or between a web server and an enterprise information system (not shown in FIG. 1 for brevity) to provide middleware functionality for an enterprise. As used herein, the term resource adapter is defined broadly to include any segment of code that represents a resource. Resources can include applications, services, databases web sites and other computer based resources. As used herein, the term application component is defined broadly as any data entry, update, query or program that processes data on behalf of a user. Users may be human or computational entities, including proxies and the like. Requestors may be users, proxies or automated entities. As used herein, the term environment is intended to be broadly construed to include a set of any characteristics of a computer configuration, including hardware and software characteristics, such as without limitation, operating system, Central Processor Unit (CPU) model, data communications systems, database systems, programming languages and any applicable standards. As used herein, the term residing is intended to be broadly construed to include applications loaded into active memory, persisted in storage, being executed by a processor and other associations between applications and environments known in the computing arts. Embodiments implement connector architecture 100 to enable one or more connections to be established between the application component 140 and the resources 130a, 130b.

In one embodiment, the connector architecture implementation 100 is compatible with the Java 2 Enterprise Edition (J2EE) Connector Architecture. This architecture provides for an EIS vendor-provided resource adaptor and an application server, to which the resource adaptor interfaces. The J2EE Connector Architecture defines a set of contracts, such as transactions, security, and connection management, which both the resource adaptor and application server require to communicate with one another. The connector architecture 100 may be implemented in an application server and a resource adaptor.

Application server 110 embodiments can be configured from a variety of hardware and software products. The application server 110 may run Java or other programming language environment, and may be configured to provide access to resources internal to the server, as well as resources reachable by the application server 110. Resources 130a, 130b can include applications, services, databases web sites and other computer based resources. These resources may be part of an Enterprise Information System (EIS) or independent resources reachable by network or other communications mechanisms. In one embodiment, the application server 110 utilizes WebLogic® Server from BEA systems of San Jose, Calif.

As further illustrated by FIG. 1, application server 110 includes an application server transaction manager 112 for managing transactions initiated by application component 140. A Transaction Manager embodiment comprises techniques for recovering from an incomplete transaction. In an embodiment, recovering from an incomplete transaction can include creating a dummy resource and registering the dummy resource with the Transaction Manager 112 using a name that would have been used by a previous use of a Resource Adapter 120 before a server crash or other unforeseen event. The Transaction Manager 112 checks the name of the dummy resource to determine whether the name was involved in an unresolved transaction. When the Transaction Manager 112 determines that the name was involved in an unresolved transaction, the dummy resource is invoked to initiate a recovery. Embodiments can provide a notification mechanism by which Transaction Manager 112 is enabled to determine that recovery is needed. A process for recovering from an incomplete transaction will be described in further detail below with reference to FIGS. 2-3.

Resource adaptors 120a, 120b comprise system level software drivers used by application server 110 to connect to resources 130a, 130b, respectively. In an embodiment, resource adaptors 120a, 120b comprise Java code and any native components required to facilitate interconnection between the application server 110 and the resources 130a, 130b. In one embodiment, the connector architecture 100 supports resource adaptors developed by vendors and third party application developers that can be deployed in any application server according to the J2EE platform specification.

As further illustrated by FIG. 1, Resource Adaptors 120a, 120b include Resource Managers 122a and 122b, respectively. Resource Managers 122a, 122b register their respective resources with the transactions manager 112.

Application component 140 may be at least a subset of an application that initiates transactions. Application component may be implemented for example and without limitation, using an enterprise java bean (EJB), Java Server Page (JSP), servlet, or any combination thereof, that is deployed, managed, or executed on the application server 110.

The connector architecture 100 of FIG. 1 further includes system level contracts (not shown in FIG. 1 for brevity). System level contracts govern the interactions between the resource adaptor 120 and the application server 110. The contracts may relate to connection management or other aspects of the connector architecture. Connection management contracts allow an application server the ability to provide a pool of connections that enable application components to connect to various resources 130a, 130b. In one embodiment of the present invention, the connection management relates to connection pool configuration, connection pool management, and connection management.

An example employing the XA protocol recovery process by which atomicity of transactions is ensured even when a server failure occurs while in the middle of completing a transaction will next be described to illustrate some of the features and benefits available to embodiments. The XA recovery process is relevant to two-phase transactions. Two-phase transactions are useful when more than one Resource Manager is involved in the transaction. In one embodiment, the Transaction Manager 112 conducts optimization by switching to a one-phase commit protocol instead of a two phase commit protocol in the event that there is only one Resource Manager involved. Processing for performing a two-phase commit transaction will next be described with reference to FIG. 2.

Figure 2:
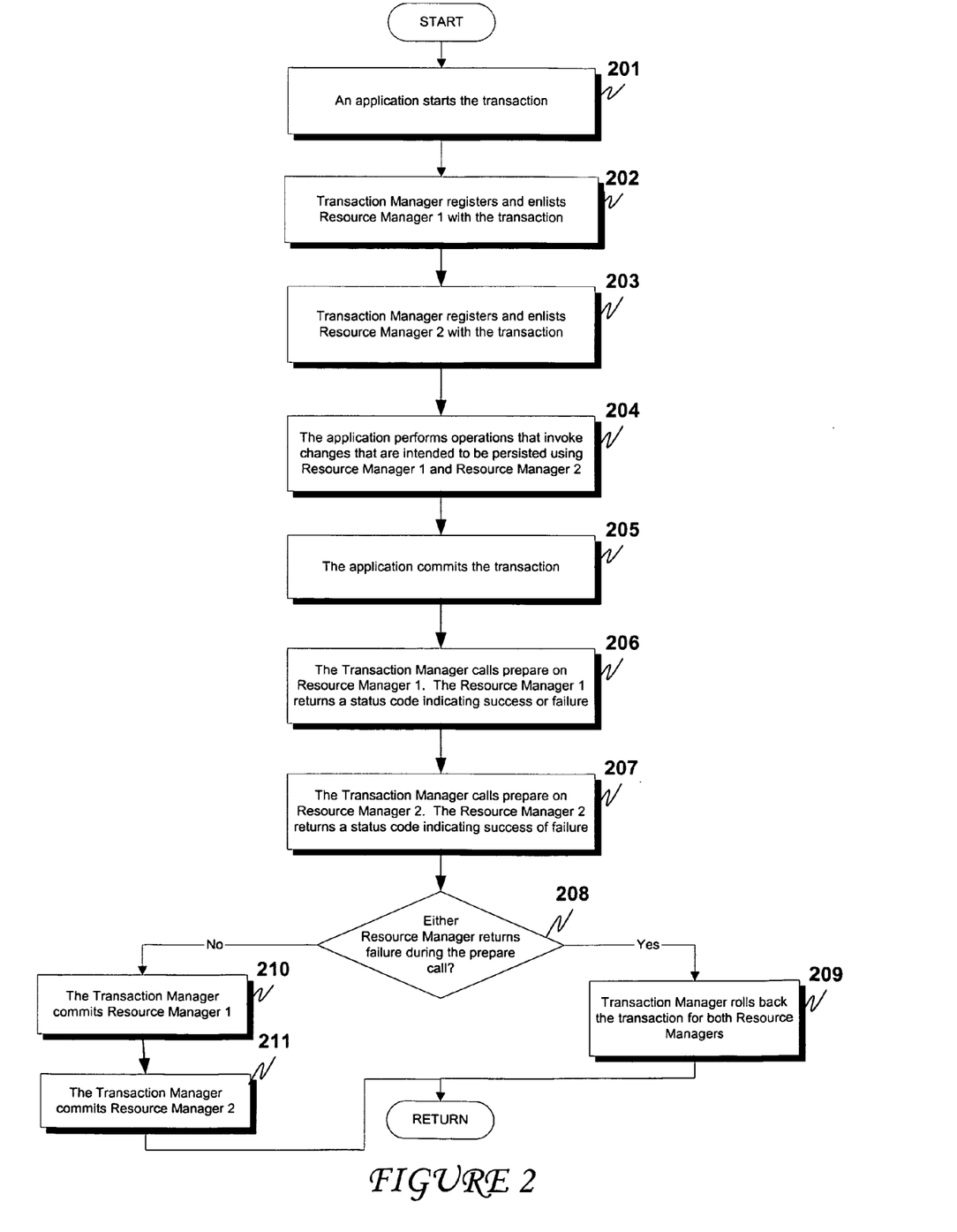
FIG. 2 illustrates an overview of a two phase commit process for committing transactions.

FIG. 2 illustrates an overview of a two phase commit process for committing transactions. As shown in FIG. 2, the commit process commences with an application starting the transaction (block 201). The Transaction Manager registers and enlists Resource Manager 1 with the transaction (block 202). The Transaction Manager registers and enlists Resource Manager 2 with the transaction (block 203). The application performs operations that invoke changes that are intended to be persisted using Resource Manager 1 and Resource Manager 2 (block 204). The application commits the transaction (block 205). The Transaction Manager calls prepare on Resource Manager 1. The Resource Manager 1 returns a status code indicating success or failure (block 206). The Transaction Manager calls prepare on Resource Manager 2. The Resource Manager 2 returns a status code indicating success of failure (block 207). If either Resource Manager returns failure during the prepare call, the Transaction Manager rolls back the transaction for both Resource Managers (blocks 208-209). Otherwise both Resource Managers are committed: The Transaction Manager will commit Resource Manager 1 if both Resource Managers returned prepare success (block 210) and commit Resource Manager 2 if both Resource Managers returned prepare success (block 211).

In this way, atomicity is maintained so that if a change to one resource is made, it is ensured that the corresponding change will be made to all other resources in the transaction.

A recovery mechanism is desired, however, in the event where this process is interrupted by a server crash for example at the point in the process between block 210 and block 211 shown above by FIG. 2. Should such a failure occur, one set of changes has been committed via Resource Manager 1, but the corresponding change has not been made by Resource Manager 2.

The application server transaction manager 112 maintains the state of the transaction persistently in a file called the transaction Log. After a server crash and restart, the Transaction Log will contain the information that the Transaction was not fully completed. It cannot be known however which Resource Managers were fully committed or not, since it may have crashed after sending the request but before receiving a response from the Resource Manager. It is the responsibility of the Resource Manager to indicate which changes are in a prepared but not yet committed state. When the recovery process is initiated by the Transaction Manager, it sends a request to the Resource Managers asking for a list of transaction Ids, that were prepared but not yet committed. The Resource Managers return the list of changes in this state, and the Transaction Manager can then complete the transactions by committing the remaining resources.

One of the problems with conventional two phase commit processing is the process by which the application server Transaction Manager 112 initiates the recovery process for an incomplete transaction. The Transaction Manager does not check what needs to be recovered until an RM is registered (as done in blocks 202 and 203 illustrated by FIG. 2. When an RM is registered with a given name, the Transaction Manager then checks the transaction log to see if there were any unresolved transactions that involved a Resource Manager of the same name. If so, the Transaction Manager will call the recover method on the newly registered Resource Manager. This is a problem because the Connector Container has no knowledge if any resources for a Resource Adapter need to be recovered, and the Transaction Manager will not invoke recovery until there is a registration of such a resource.

If the resource adapter is not used for a long period, the registration may not occur until this time. One solution is for the Connector Container to always create a connection to the backend via the Resource Adapter and to register the connection with the Transaction Manager in order to allow any needed recovery to be initiated. This would work, but in the case where recovery is not needed it will cause a connection to be unnecessarily created.

Figure 3:
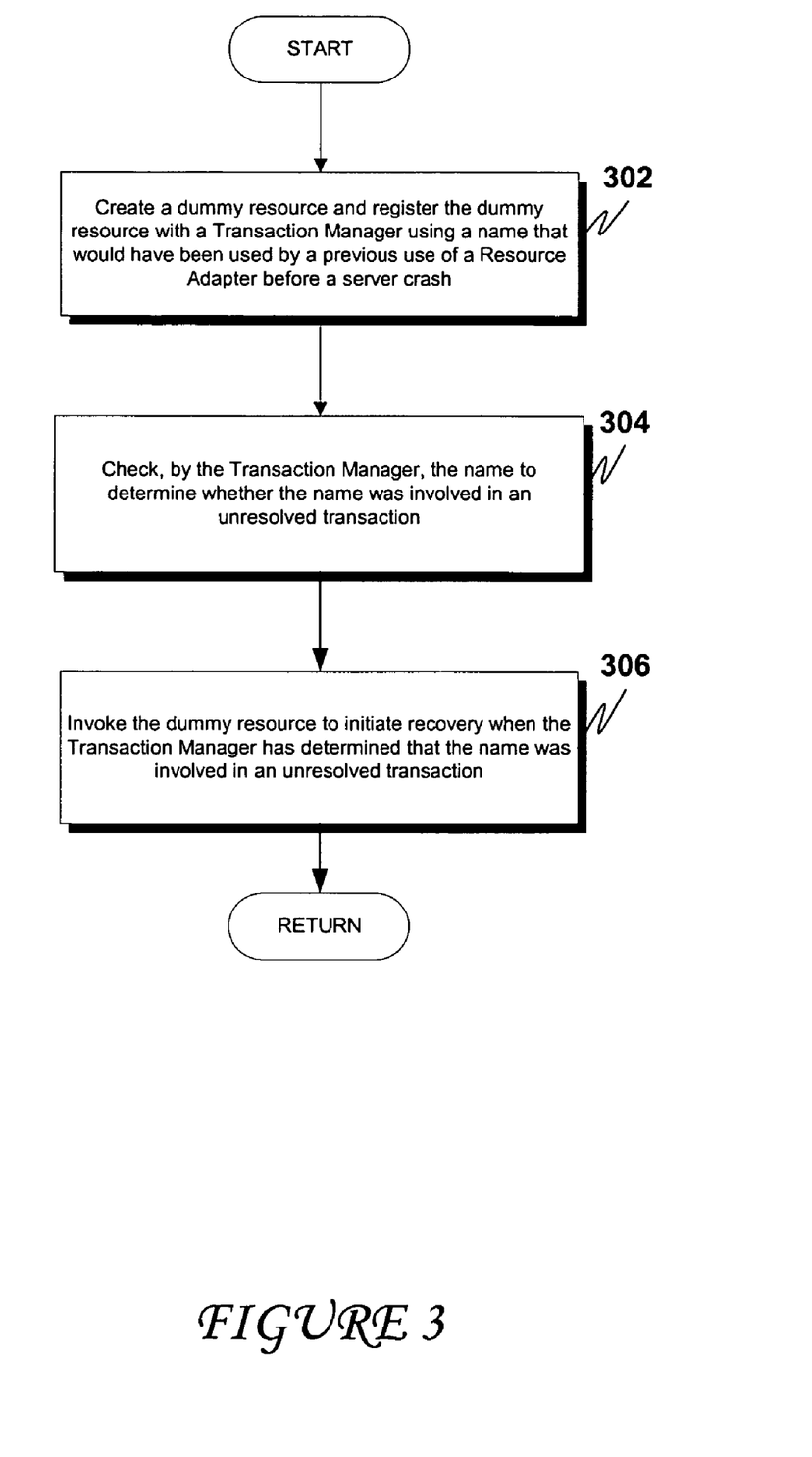
FIG. 3 is an operational flow diagram illustrating a high level overview of a technique for recovering from an incomplete transaction in an embodiment.

FIG. 3 is an operational flow diagram illustrating a high level overview of a technique for recovering from an incomplete transaction in an embodiment. The technique for recovering from an incomplete transaction shown in FIG. 3 is operable with an application server, application component and resource adaptor, such as application server 110, application component 140 and resource adaptor 120 of FIG. 1, for example. As shown in FIG. 3, a dummy resource is created and registered with the Transaction Manager using a name that would have been used by a previous use of a Resource Adapter before a server crash (block 302). The Transaction Manager checks the name to determine whether the name was involved in an unresolved transaction (block 304). The dummy resource can be invoked to initiate recovery when the Transaction Manager has determined that the name was involved in an unresolved transaction (block 306). Accordingly, the dummy resource can then be used as a notification mechanism by which it can be determined that recovery is needed. In an embodiment, a real connection will be created via the Resource Adapter, and the recover request passed on to the real underlying Resource Manager for the Resource Adapter. The processing of blocks 302-306 can enable embodiments to avoid creating real adapter connections unnecessarily for allowing recovery to initiate immediately upon server restart and adapter redeployment.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for recovering from an incomplete transaction as discussed herein.

Figure 4:
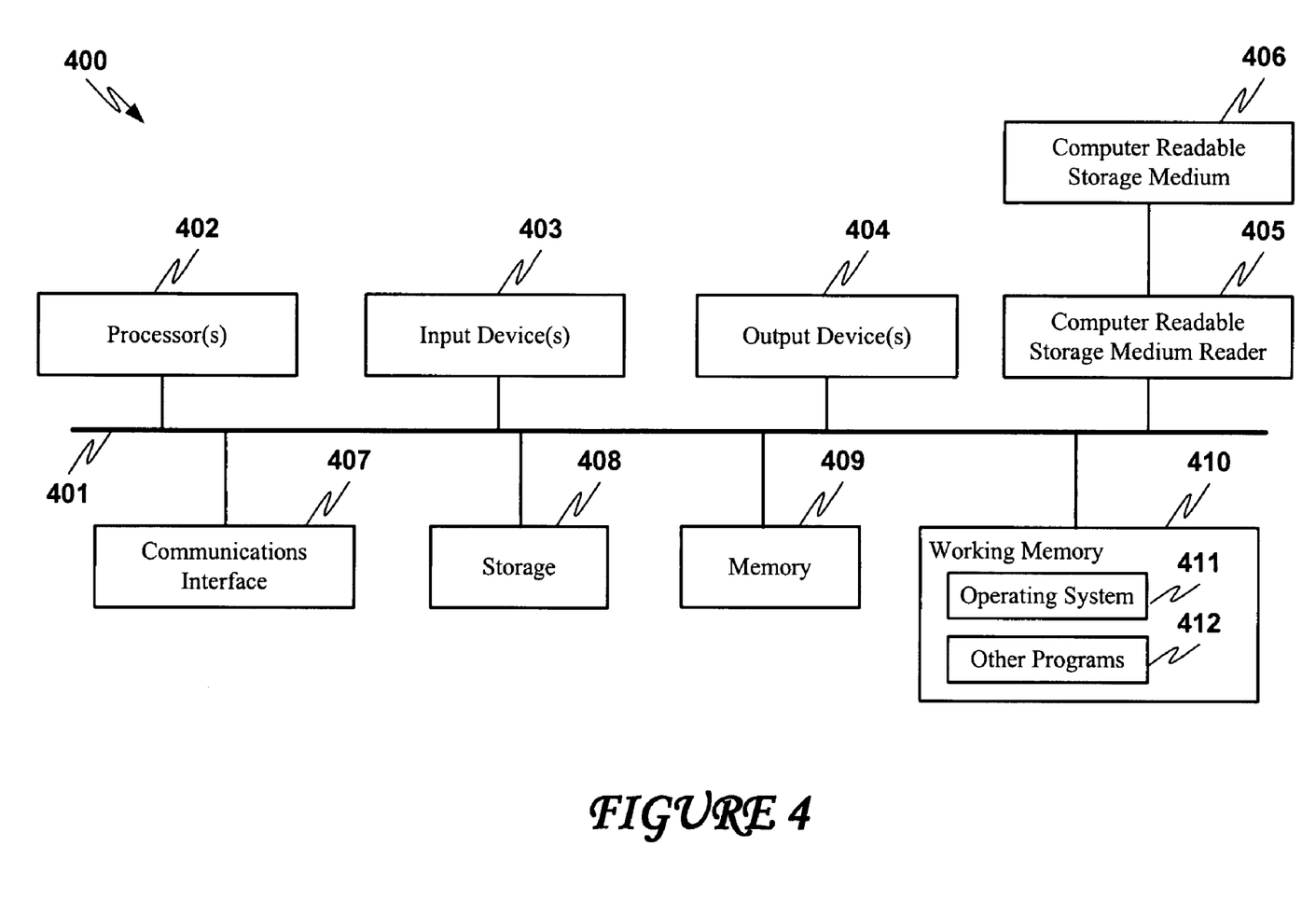
FIG. 4 is a hardware block diagram of an example computer system, which may be used to embody one or more components in an embodiment.

FIG. 4 illustrates an exemplary processing system 400, which can comprise one or more of the elements of FIG. 1. Turning now to FIG. 4, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 400 comprises components coupled via one or more communication channels (e.g., bus 401) including one or more general or special purpose processors 402, such as a Pentium®, Centrino®, Power PC®, digital signal processor ("DSP"), and so on. System 400 components also include one or more input devices 403 (such as a mouse, keyboard, microphone, pen, and so on), and one or more output devices 404, such as a suitable display, speakers, actuators, and so on, in accordance with a particular application. (It will be appreciated that input or output devices can also similarly include more specialized devices or hardware/software device enhancements suitable for use by the mentally or physically challenged.)

System 400 also includes a machine readable storage media reader 405 coupled to a machine readable storage medium 406, such as a storage/memory device or hard or removable storage/memory media; such devices or media are further indicated separately as storage 408 and memory 409, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 407 may also be included, such as a modem, DSL, infrared, RF or other suitable transceiver, and so on for providing inter-device communication directly or via one or more suitable private or public networks or other components that may include but are not limited to those already discussed.

Working memory 410 further includes operating system ("OS") 411 elements and other programs 412, such as one or more of application programs, mobile code, data, and so on for implementing system 400 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 412 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 408 or memory 409) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for recovering from an incomplete transaction, the method comprising:

creating a dummy resource to represent a real connection to a real resource and registering the dummy resource with a Transaction Manager using a name that would normally be used by said real connection to the real resource before a server crash;

checking, by the Transaction Manager, the name of the dummy resource to determine whether the name was involved in an unresolved transaction; and creating the real connection to the real resource and performing recovery of the unresolved transaction using the real connection if the Transaction Manager determines that the name of the dummy resource was involved in the unresolved transaction, otherwise if the Transaction Manager determines that the name of the dummy resource was not involved in the unresolved transaction, avoiding creation of said real connection; and thereby providing a notification mechanism by which the Transaction Manager is enabled to determine that the recovery is needed, wherein creating a dummy resource and registering the dummy resource further includes:

causing the Transaction Manager to initiate recovery processing by registering a non-existent Resource Adapter with the Transaction Manager.

2. The method of claim 1, further comprising:

creating, by the Transaction Manager, the real connection via a Resource Adapter to the real resource; and passing a recover request to a Resource Manager associated with the Resource Adapter.

3. The method of claim 1, wherein checking, by the Transaction Manager, the name of the dummy resource to determine whether the name was involved in an unresolved transaction includes:

checking a transaction log to determine whether there were any unresolved transactions which involved a Resource Manager of the same name.

4. The method of claim 1, further comprising:

detecting, by a Connector Container, the notification mechanism indicating that recovery is needed; and creating said real connection via a Resource Adapter and passing on a recover request to a Resource Manager associated with the Resource Adapter.

5. A non-transitory machine-readable storage medium storing one or more sequences of instructions for recovering from an incomplete transaction, said instructions, when executed by one or more processors, causing the one or more processors to perform a set of steps including:

creating a dummy resource to represent a real connection to a real resource and registering the dummy resource with a Transaction Manager using a name that would normally be used by said real connection to the real resource before a server crash;

checking, by the Transaction Manager, the name of the dummy resource to determine whether the name was involved in an unresolved transaction; and creating the real connection to the real resource and performing recovery of the unresolved transaction using the real connection if the Transaction Manager determines that the name of the dummy resource was involved in the unresolved transaction, otherwise if the Transaction Manager determines that the name of the dummy resource was not involved in the unresolved transaction, avoiding creation of said real connection; and thereby providing a notification mechanism by which the Transaction Manager is enabled to determine that the recovery is needed, wherein the instructions for carrying out the step of creating a dummy resource and registering the dummy resource with a Transaction Manager further include instructions for carrying out the step of:

causing the Transaction Manager to initiate recovery processing by registering a non-existent Resource Adapter with the Transaction Manager.

6. The non-transitory machine-readable storage medium as recited in claim 5, further comprising instructions for carrying out the step of:

creating, by the Transaction Manager, the real connection via a Resource Adapter to the real resource; and passing a recover request to a Resource Manager associated with the Resource Adapter.

7. The non-transitory machine-readable storage medium as recited in claim 5, wherein the instructions for carrying out the step of checking, by the Transaction Manager, the name of the dummy resource to determine whether the name was involved in an unresolved transaction further include instructions for carrying out the step of:

checking a transaction log to determine whether there were any unresolved transactions which involved a Resource Manager of the same name.

8. The non-transitory machine-readable storage medium as recited in claim 5, further comprising instructions for carrying out the step steps of:

detecting, by a Connector Container, the notification mechanism indicating that recovery is needed; and creating the real connection via a Resource Adapter and passing on a recover request to a Resource Manager associated with the Resource Adapter.

9. A system for recovering from an incomplete transaction, the system comprising:

one or more processors; and one or more stored sequences of instructions which, when executed by the one or more processors, cause the one or more processors to perform a set of steps including:

creating a dummy resource to represent a real connection to a real resource and registering the dummy resource with a Transaction Manager using a name that would normally be used by said real connection to the real resource before a server crash;

checking, by the Transaction Manager, the name of the dummy resource to determine whether the name was involved in an unresolved transaction; and creating the real connection to the real resource and performing recovery of the unresolved transaction using the real connection if the Transaction Manager determines that the name of the dummy resource was involved in the unresolved transaction, otherwise if the Transaction Manager determines that the name of the dummy resource was not involved in the unresolved transaction, avoiding creation of said real connection; and thereby providing a notification mechanism by which the Transaction Manager is enabled to determine that the recovery is needed, wherein creating a dummy resource and registering the dummy resource further includes:

causing the Transaction Manager to initiate recovery processing by registering a non-existent Resource Adapter with the Transaction Manager.

10. The system of claim 9, further comprising instructions processed by the one or more processors to perform a step of:

creating, by the Transaction Manager, the real connection via a Resource Adapter to the real resource; and passing a recover request to a Resource Manager associated with the Resource Adapter.

11. The system of claim 9, wherein checking, by the Transaction Manager, the name of the dummy resource to determine whether the name was involved in an unresolved transaction further includes:
checking a transaction log to determine whether there were any unresolved transactions which involved a Resource Manager of the same name.

12. The system of claim 9, further comprising instructions processed by the one or more processors to perform the steps of:
detecting, by a Connector Container, the notification mechanism indicating that recovery is needed; and
creating said real connection via a Resource Adapter and passing on a recover request to a Resource Manager associated with the Resource Adapter.

* * * * *

UNITED STATES PATENT AND TRADEMARK OFFICE
CERTIFICATE OF CORRECTION

| | | |
|---|---|---|
| PATENT NO. | : 7,996,837 B2 | Page 1 of 1 |
| APPLICATION NO. | : 11/416906 | |
| DATED | : August 9, 2011 | |
| INVENTOR(S) | : Chesebro et al. | |

It is certified that error appears in the above-identified patent and that said Letters Patent is hereby corrected as shown below:

In column 10, line 30, before "steps of" delete "step".

Signed and Sealed this
Fifteenth Day of November, 2011

David J. Kappos
*Director of the United States Patent and Trademark Office*